United States Patent [19]
Arakawa et al.

[11] Patent Number: 5,563,764
[45] Date of Patent: Oct. 8, 1996

[54] CERAMIC SUBSTRATE HAVING LOWER ELECTRODE FOR FORMING THIN-FILM CONDENSER

[75] Inventors: Michiya Arakawa; Toshikatsu Takada, both of Nagoya, Japan

[73] Assignee: NGK Spark Plug Co., Ltd., Negoya, Japan

[21] Appl. No.: 361,668

[22] Filed: Dec. 22, 1994

[30] Foreign Application Priority Data

Dec. 24, 1993 [JP] Japan .................................. 5-347655

[51] Int. Cl.$^6$ .............................. H01G 4/012; H01G 4/33
[52] U.S. Cl. .................. 361/304; 361/321.1; 361/321.2; 361/271; 361/321.4; 29/25.42
[58] Field of Search ................... 361/304, 306.1, 361/306.3, 321.1, 321.2, 321.3, 271, 321.4, 532, 271; 174/258, 266, 262; 29/25.03, 25.42; 428/690; 257/691, 780

[56] References Cited

FOREIGN PATENT DOCUMENTS

| | | |
|---|---|---|
| 52-53257 | 4/1977 | Japan . |
| 60-55975 | 12/1985 | Japan . |
| 63-49385 | 10/1988 | Japan . |
| 5-13066 | 2/1993 | Japan . |

Primary Examiner—Leo P. Picard
Assistant Examiner—Anthony Dinkins
Attorney, Agent, or Firm—Foley & Lardner

[57] ABSTRACT

A ceramic substrate has on the surface thereof a lower electrode for forming a thin-film condenser, wherein the lower electrode is formed by plating or the lower electrode consists of a plating layer formed on the surface of the ceramic substrate.

6 Claims, 7 Drawing Sheets

CERAMIC SUBSTRATE HAVING LOWER ELECTRODE FOR FORMING THIN-FILM CONDENSER

BACKGROUND OF THE INVENTION

1. Field of the Invention

The present invention relates in general to a ceramic substrate having a lower electrode for forming a thin-film condenser on the surface of the substrate and more particularly to a ceramic substrate having a lower electrode which is constructed so as to prevent an insulation defect, short defect, etc. of a condenser.

2. Description of the Prior Art

Due to recent development of the integrated circuit technology, the operation frequency of the circuit has become considerably higher for attaining a high-speed operation. With this high operation frequency, it has been practiced to install or form a bypass condenser on a ceramic substrate with a view to preventing an erroneous operation of the integrated circuit.

Because the condenser is required to be compact in size in itself notwithstanding it is also required to have a relatively large capacity and because of the properties of the condenser, it has been considered to form the condenser on a surface portion of the ceramic substrate adjacent the integrated circuit.

In this instance, in order to attain a large electrostatic capacity within a limited area, it is necessitated to reduce the thickness of the dielectric layer, so it has been practiced to form the dielectric layer by a thin-film forming technique such as spattering, CVD (chemical-vapor deposition), sol-gel method, etc.

However, in case of forming a dielectric layer which is so thin as to be several microns or less thick, the surface conditions of the substrate and the lower electrode become important.

This is because, when the surface of the substrate is rough, it is impossible to form and laminate the lower electrode and the dielectric layer uniformly, resulting in a possibility that a short circuit due to contact between the upper and lower electrodes or breakdown at a low voltage is caused to adversely affect the properties of the condenser.

Though the rough surface of the substrate can be improved to some extent by grinding or polishing, grinding for attaining sufficient smoothness requires too much man-hour and therefore a high cost. Furthermore, in case a ceramic substrate is used, it is inevitable that the surface of the substrate are formed with recessed portions due to pores of the ceramic substrate, and furthermore a problem may be caused by the irregularity or unevenness of the surface of the substrate due to flaws or scratches at the time of grinding.

Accordingly, in case of forming a thin-film condenser, it has been practiced to use a Si-wafer as disclosed in Japanese patent publication (after examination) No. 60-55975 or to use a ceramic substrate which is glazed to have a smoothed surface. However, the Si-wafer is encountered by a difficulty in its installation on an integrated circuit package, and the glazed ceramic substrate is expensive.

While it has further been proposed to form a thin-film condenser on a ceramic substrate which is not glazed as disclosed in Japanese Patent after-examination publication No. 60-55975 and Japanese Utility Model provisional publication No. 5-13066, the condenser according to the former publication has a problem that it requires a difficult manufacturing process, thus increasing the cost, and furthermore it is poor in the heat-resisting property, whereas the latter publication is incapable of offering a fundamental solution to the above described problem since its lower electrode is formed by vapor deposition.

Further, by strictly controlling the employed method of producing a ceramic substrate so that the ceramic substrate which is extremely reduced in the number and size of pores is obtained and by paying sufficient attention to the grinding so that the surface of the ceramic substrate is not formed with any flaw or scratch at the mime of grinding, the surface of the ceramic substrate having a small irregularity can be obtained, thus making it possible to solve or at least mitigate the above described problem. However, the manufacture or production of such a ceramic substrate is difficult, thus resulting in a high manufacturing cost, and furthermore the properties of such a ceramic substrate are different from those of the ceramic substrate having pores in the surface thereof, thus causing a design inconvenience.

SUMMARY OF THE INVENTION

According to an aspect of the present invention, there is provided a novel and improved ceramic substrate which has on the surface thereof a lower electrode for forming a thin-film condenser, wherein the lower electrode is formed by plating.

According to another aspect of the present invention, the thickness $Y$ (μm) of the lower electrode and the maximum pore diameter $X$ (μm) of pores existing in the surface of the ceramic substrate have a relation expressed by $Y \geq 1.1 \sqrt{X}$.

According to a further aspect of the present invention, the plating is luster plating.

According to a further aspect of the present invention, there is provided a novel and improved ceramic substrate and electrode assembly which comprises a ceramic substrate having a planar surface, and a lower electrode for a thin-film condenser, formed on the planar surface of the ceramic substrate, wherein the lower electrode consists of a plating layer.

According to a further aspect of the present invention, there is provided a novel and improved ceramic substrate and condenser assembly which comprises a ceramic substrate having a main planar surface, and a plurality of small thin-film condensers of a relatively small capacity formed on the ceramic substrate and electrically connected to constitute a condenser of a relatively large capacity, wherein the small thin-film condensers have a common lower electrode which consists of a plating layer formed on the main planar surface of the ceramic substrate.

The above structure is effective for solving the above noted problems inherent in the prior art device.

It is accordingly an object of the present invention to provide a novel and improved ceramic substrate which makes it possible to produce a thin-film condenser of a high reliability at a high yield rate.

It is another object of the present invention to provide a novel and improved ceramic substrate and electrode assembly of the above described character.

It is a further object of the present invention to provide a novel and improved ceramic substrate and condensor assembly of the above described character.

DESCRIPTION OF THE PREFERRED EMBODIMENTS

Referring to FIGS. 1 to 5, a ceramic substrate according to an embodiment of the present invention will be described.

Figure 1:
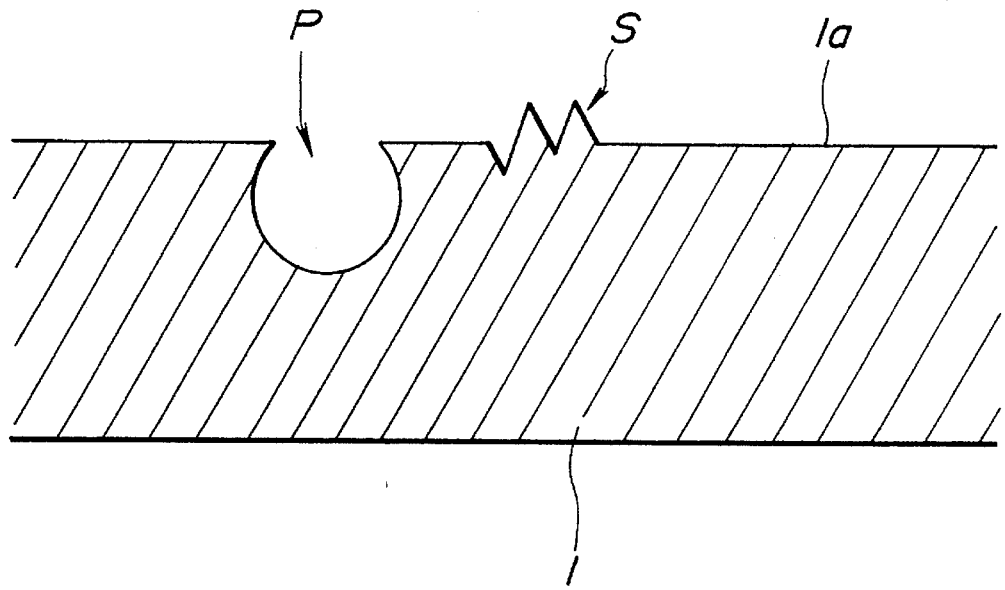
FIG. 1 is a schematic, fragmentary sectional view of a ceramic substrate for illustrating the surface condition in an exaggerated manner.
Figure 2:
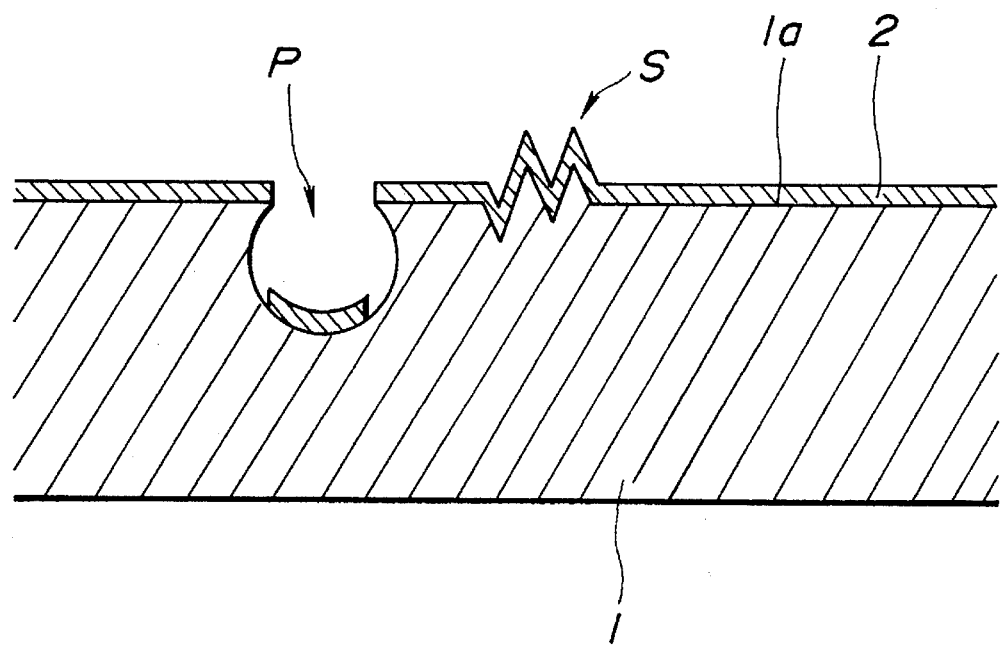
FIG. 2 is a view similar to FIG. 1 but shows a ceramic substrate in a condition of being formed with an underlayer.

On the surface 1a of a ceramic substrate 1 shown in FIG. 1, a Ti—Cu lower electrode underlayer 2 (0.2–0.5 μm) is formed by spattering as shown in FIG. 2. The surface of the substrate has pores "P" and flaws or scratches "S" produced at a manufacturing process such as a grinding process, etc., though only one pore and one flaw are shown for brevity.

Figure 3:
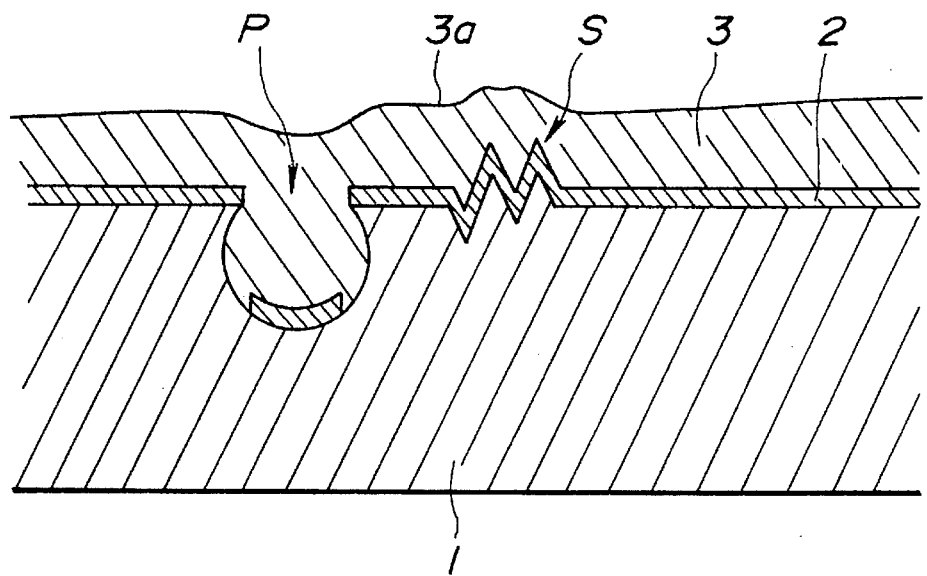
FIG. 3 is a view similar to FIG. 2 but shows a ceramic substrate in a condition of being further formed with a lower electrode on the ceramic substrate by plating according to an embodiment of the present invention.

Thereafter, as shown in Fig. 3, a lower electrode 3 consisting of a copper plating layer (7 μm) and a nickel plating layer (3 μm) by electroplating is formed.

In this connection, the plating layer 3 grows or increases in thickness in such a manner as to effect "levelling", "flattening" or "smoothing" by covering the pores "P" and the flaw "S".

In case of plating, the plating layer grows more at the recessed portions such as the pores "P", flaws "S", etc., than at the protruded portions, resulting in that the lower electrode does not have a surface roughness like that of the ceramic substrate but has a flatter or smoother surface.

Accordingly, the lower electrode surface 3a is smoother as compared with the ceramic substrate surface 1a.

Figure 4:
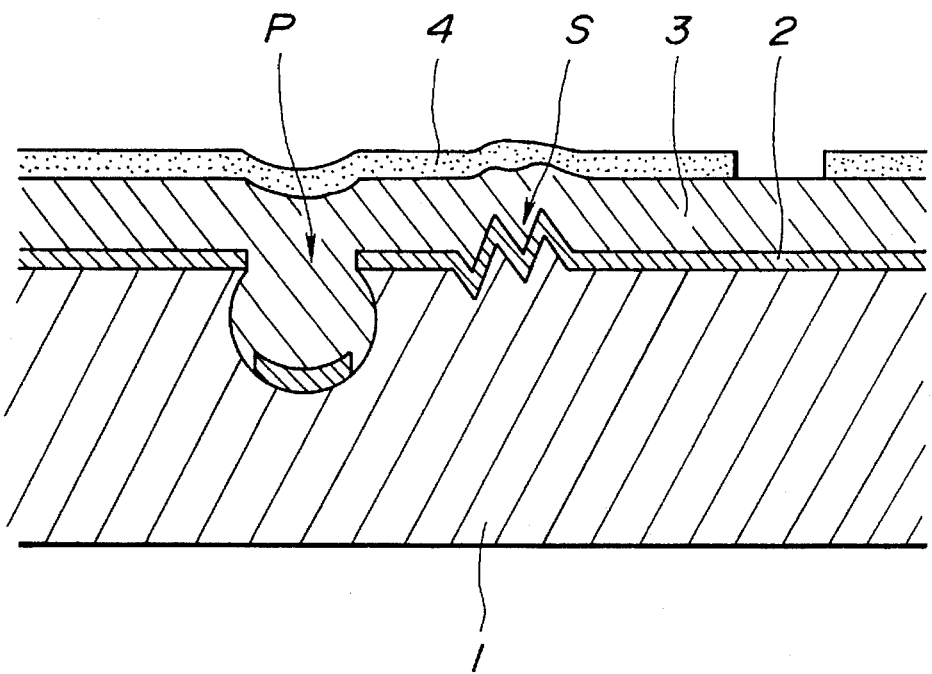
FIG. 4 is a view similar to FIG. 3 but shows the ceramic substrate in a condition of being further formed with a dielectric layer.

On the ceramic substrate 1 having such a lower electrode 3, a $Ta_2O_5$ dielectric layer 4 is formed by reactive spattering in a desired place so as to be about 0.5–1 μm thick (refer to FIG. 4).

Figure 5:
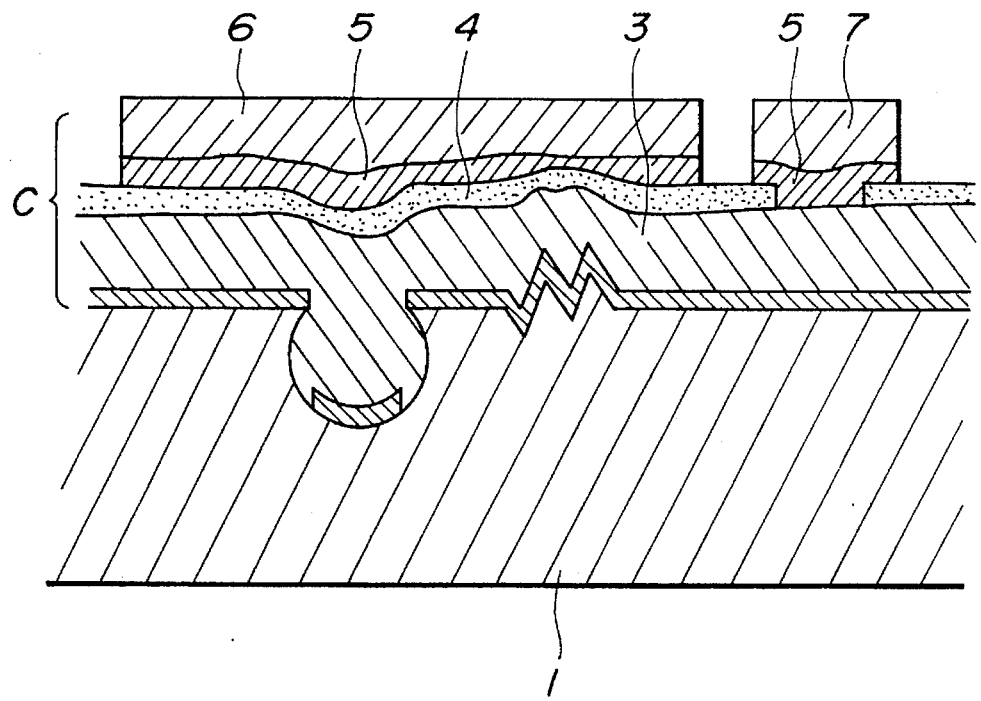
FIG. 5 is a view similar to FIG. 4 but shows the ceramic substrate in a condition of being further formed with an upper electrode, etc.

Further as shown in FIG. 5, an upper electrode underlayer 5 (0.3–0.5 μm) made up of a Mo—Cu thin-film is formed by smattering and then formed into a desired pattern by photolithography. Thereafter, a Cu-plating layer (5 μm) and a Ni-plating layer (3 μm) are formed in such a manner as to constitute an upper electrode 6 and a leading electrode 7, whereby to complete the ceramic substrate/sample Nos. 1 and 2).

By this, a thin-film condenser "C" on the ceramic substrate is completed and is capable of storing, by way of the leading electrode 7, a charge between the lower electrode 3 and the upper electrode 6.

In this instance, since the plating layer 3 is used as the lower electrode, the surface 3a of the lower electrode 3 is relatively smooth even if there is some pores "P" and flaws "S" at the surface 1a of the ceramic substrate 1, so even if the upper electrode 6 is formed by way of the dielectric layer 4 which is so thin, a short circuit between the lower electrode 3 and the upper electrode never occurs and further breakdown at low voltage due to extremely close locations of the electrodes never occurs.

Further, a ceramic substrate (sample No. 3) formed with a molybdenum spattering layer on the surface of a lower electrode 3 in order to improve the adherence of a dielectric layer to the lower electrode was produced.

Since the plating of the lower electrode does not necessarily require two or more kinds of plating layers, a sample having only one Cu-plating layer (10 μm) is prepared according to a variant of the present invention (sample No. 4).

In the meantime, the above described plating was made by, in case of Cu-plating, electroplating in the plating solutions of copper sulfate added with brighter such as cover cream PCM of Meltechs Corporation's make and by, in case of Ni-plating, an ordinary Watt bath.

Comparative examples having lower electrodes which are formed by vapor deposition and spattering will be described with reference to FIGS. 6 to 8.

A ceramic substrate 1 similar to that in the previous embodiment of FIG. 1 is used. On this substrate, a lower electrode underlayer 2 made up of a Ti—Cu spatter thin-film (0.2–0.5 μm) similar to that in the above described embodiment is formed.

Then, differing from the above described embodiment, a lower electrode 13 is formed not by plating but by spattering, so as to be made up of a Cu spatter layer (7 μm) and a Ni spatter layer (3 μm).

Figure 6:
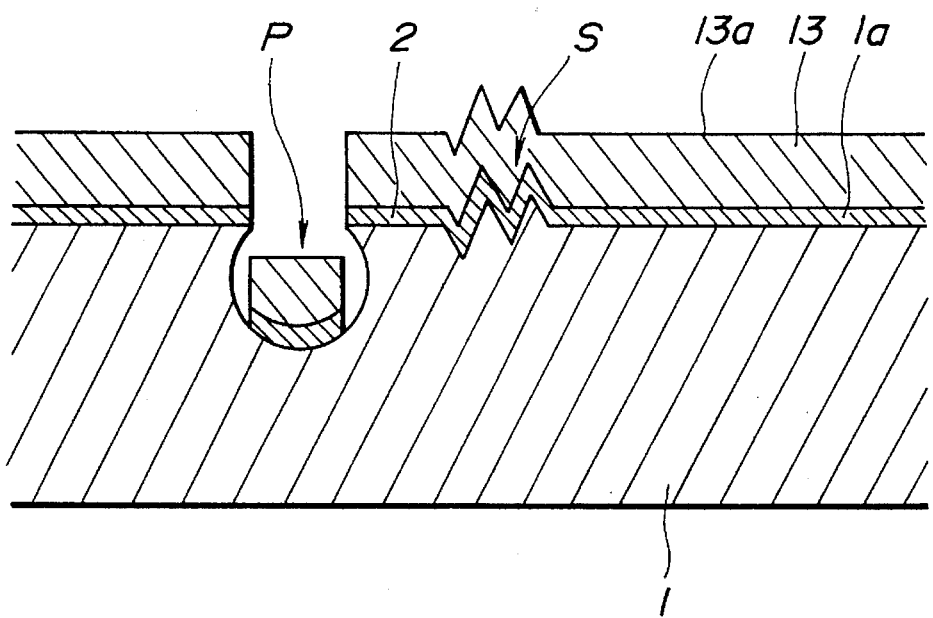
FIG. 6 is a view similar to FIG. 2 but shows the ceramic substrate in a condition of being further formed with a lower electrode by spattering according to a comparative example.
Figure 7:
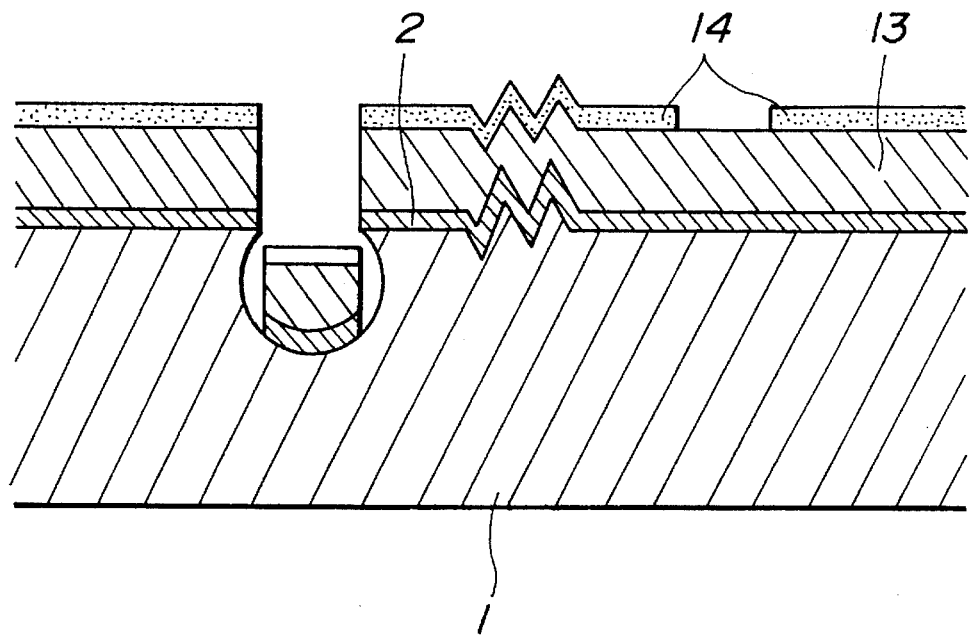
FIG. 7 is a view similar to FIG. 6 but shows the ceramic substrate in a condition of being further formed with a dielectric layer.

In such a case, the spatter thin-film cannot produce, differing from a plating layer, a flattening or smoothing effect, so that the lower electrode surface 13a, as shown in FIG. 6, is not flattened or smoothed at the portion due to the irregularity of the surface 1a of the substrate 1 as caused at the portion having the pores "P" and the flaws "S".

Thereafter, similarly to the above described embodiment, a dielectric layer 14 of $Ta_2O_5$ is formed by reactive spattering so as to be 0.5~1 μm thick (refer to FIG. 7), and on an upper electrode underlayer 15 an upper electrode 16 and a leading electrode 17 are formed (refer to FIG. 8), whereby to obtain samples (sample Nos. 5 and 6).

Figure 8:
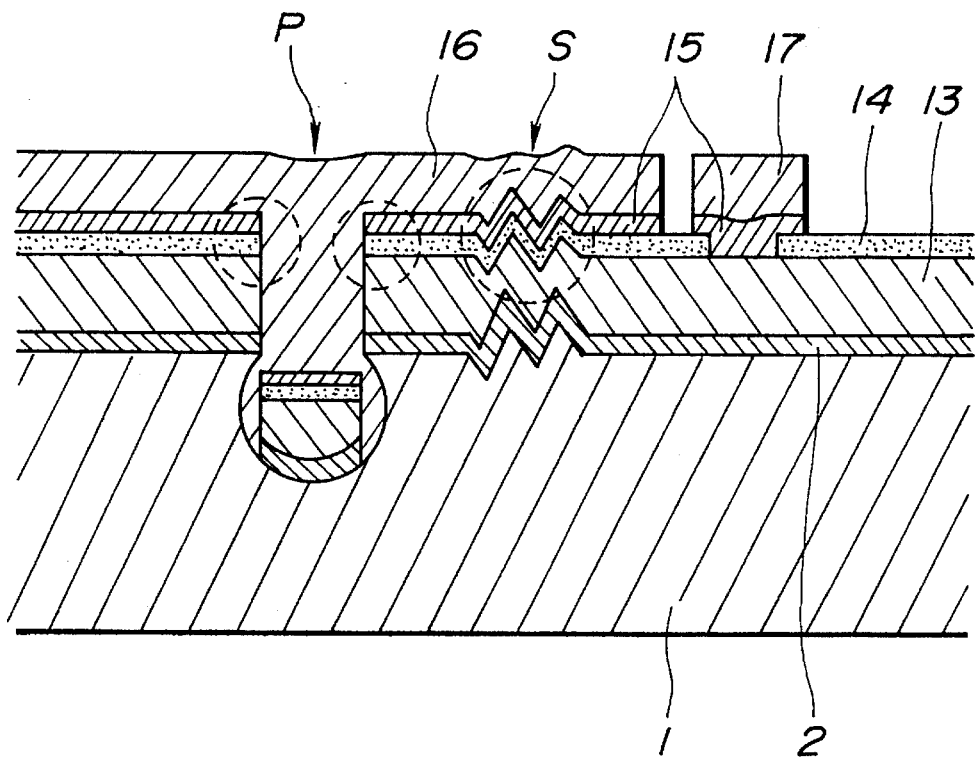
FIG. 8 is a view similar to FIG. 7 but shows the ceramic substrate in a condition of being further formed with an upper electrode.

However, the thin-film condenser formed in such a method encounters a problem of a short circuit at ceramic substrate surface portions having pores "P", flaws "S", etc., as for example at places indicated by dotted line circles in FIG. 8, or a problem of breakdown at a low voltage.

Accordingly, such a thin-film condenser lacks reliability in operation, and the yield rate in its production is low, so there is a difficulty in its practical use.

This is because by spattering or the like the Cu spatter layer or the Ni spatter layer on the ceramic substrate 1 grows only in the thickness direction of the substrate, so the irregularity of the ceramic substrate 1 is not flattened or smoothed by the spatter layer, and therefore even when the dielectric layer 14 is formed the lower electrode layer 13 may possibly contact the upper electrode 16 or come extremely close to the same.

From Table I, it will be seen that the thin-film condenser of this invention (sample Nos. 1–4) is high in the ratio of successful products and retains a good insulation resistance, whereas the comparative examples (sample Nos. 5 and 6) has a short circuit or low insulation resistance between the upper electrode and the lower electrode and is incapable of being used as a condenser.

TABLE I

| SAMPLE No. | | UNDERLAYER/ LOWER ELECTRODE | DIELECTRIC LAYER | UNDERLAYER/ UPPER ELECTRODE | RATIO OF SUCCESSFUL PRODUCTS (%) |
|---|---|---|---|---|---|
| 1 | INVENTION | Ti—Cu(0.2–0.5 μm) Cu—Ni(7–3 μm)PLATING | Ta$_2$O$_5$ (0.5–1.0 μm) | Mo—Cu(0.3–0.5 μm) Cu—Ni(5–2 μm)PLATING | 93.8 |
| 2 | " | ↑ | ↑ | ↑ | 94.5 |
| 3 | " | Ti—Cu(0.2–0.3 μm) Cu—Ni(7–3 μm)PLATING Mo(0.3 μm)SPATTER | ↑ | ↑ | 91.0 |
| 4 | " | Ti—Cu(0.2–0.3 μm) Cu(10 μm)PLATING | ↑ | ↑ | 93.0 |
| 5 | COMPARATIVE EXAMPLE | Ti—Cu(0.2–0.3 μm) Cu—Ni(7–3 μm)SPATTER | ↑ | ↑ | 0 |
| 6 | COMPARATIVE EXAMPLE | ↑ | ↑ | ↑ | 0 |

In order to recognize the effect of the invention, measurements of the insulation resistances and comparisons thereof were made on the thin-film condensers of the examples of the present invention and of the comparative examples.

In this connection, such a ceramic substrate 1 was used that is made of a material containing 92% of alumina and has a surface roughness Ra=0.2 μm or so, the pore diameter (i.e., the diameter of pore "P" existing in the surface of the substrate) X=10 ~20 μm, pores "P" of the number of about 100 /mm$^2$, and flaws "S" of the depth of about 3 μm.

Further, the ceramic substrate 1 is sized to be 50 mm×50 mm×2.0 mm (i.e., 50 mm long, 50 mm wide and 2.0 mm thick), and the lower electrode 3 or 13 is sized to be 48 mm×48 mm (i.e., 48 mm long and 48 mm wide) so that it covers almost all the surface of the ceramic substrate to serve as a common electrode.

Figure 9:
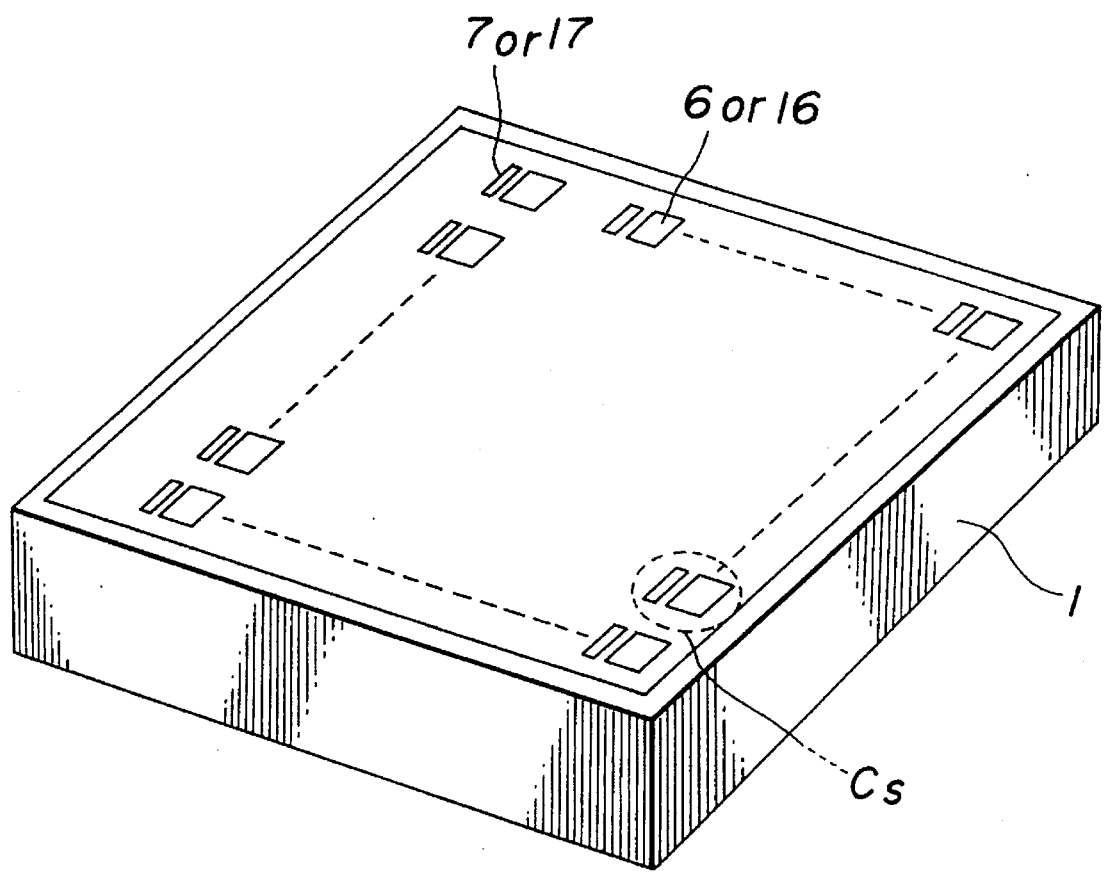
FIG. 9 is a perspective view of a ceramic substrate which is formed with a plurality of small thin-film condensers according to a further embodiment of the present invention.

On the other hand, small electrodes of 1.27 mm long and 1.27 mm wide and in the number of 256 (sixteen arrays in the lengthwise direction and sixteen arrays in the widthwise direction so that 16×16=256) were formed to serve as the upper electrodes 6 or 16. By this, small condensers "Cs" of the number of 256 were formed (refer to FIG. 9).

The reason why the upper electrode is divided into a number of small condensers "Cs" is that to form a condenser of a desired capacity by interconnecting only the small condensers having successfully stood the test makes it possible to attain a higher yield rate than to form a condenser having an upper electrode of a larger area.

The judgment on whether the condenser successfully stands the test or not was made by measuring the insulation resistance between the upper electrode 6 and the leading electrode 7 or between the electrodes 16 and 17 at a room temperature and by application of a voltage of 25 volts for 10 seconds and by determining in such a manner that the condenser is determined to successfully stand the test when the insulation resistance is equal to or larger than 1000 MΩ, and was expressed by the ratio of successful products (i.e., yield rate).

The result is shown in Table I.

Accordingly, it is revealed that even if there are some pores and flaws in the surface of a ceramic substrate, employment of a plating layer as a lower electrode makes it possible to form a flattened or smoothed surface on the ceramic substrate and obtain a thin-film condenser successfully.

On the contrary, it will be apparent that thin-film or layer formed by spattering which cannot produce a flattening or smoothing effect, cannot overcome a short circuit defect or low insulation resistance defect even if the coating by spattering is made so as to have the same thickness as that of a plating layer. This can similarly be applied to the case of forming of a layer by deposition or the like which does not have a flattening or smoothing function.

Furthermore, a thin-film forming technique by spattering or the like generally requires the more costly equipment and man-hour as compared with plating, so employment of the plating layer is advantageous from the cost point of view.

In this connection, in order to improve the flatness or smoothness of the surface, it is desirable to employ luster plating for forming the surface of the lower electrode. Generally, depending on the difference of additives to plating solutions, plating is roughly classified into luster plating having luster and lusterless plating having no luster. Of those kinds of plating, the luster plating causes the plating layer to grow in such a manner as to form the flatter or smoother plating surface as compared with the lustless plating, so the luster plating is more suited for adoption to a lower electrode of a thin-film condenser.

A second embodiment will be described hereinbelow.

In the above described first embodiment of FIGS. 1 to 5, a thin-film condenser is formed by using a ceramic substrate having some pores and flaws and by selectively setting the thickness of the plating layer as a lower electrode suitably. In this connection, it is supposed that the necessitated thickness of the plating layer and the surface condition of the ceramic substrate may have some relation with each other.

Particularly, the flaws, scratches or the like caused at the time of grinding can be lessened in the number and degree by a suitable process, and further in many cases, as will be seen from the substrate used in the first embodiment, the size of the flaws or scratches at the time of grinding can be made smaller as compared with that of the pores.

However, in many cases, there is a difficulty in decreasing the number and size of the pores for the reason of the properties and the material of the substrate.

Thus, as a second embodiment, condensers of various maximum pore diameters of the pores existing in the surface (i.e., the surface on which condenser is to be formed) of the ceramic substrate and of various thicknesses of the lower electrodes (plating layer) were prepared and subjected to measurement of insulation resistance to obtain the ratio of successful products (i.e., yield rate).

In this connection, since it is difficult to form the samples of various sizes of pores existing in the surface of the ceramic substrate, from the same material, it was decided to vary the material of the substrate in order to obtain the pores of the varying size, and 92% alumina, 99.5% of alumina, glass ceramic and AlN (aluminum nitride) were used. The maximum pore diameter in these substrates were 20 μm in case of 92% alumina, 5 μm in case of 99.5% alumina, 3 μm in case of glass ceramic, and 50 μm in case of AlN.

In this connection, to determine the maximum pore diameter, the surface of the ceramic substrate for forming thereon a condenser was observed by means of an optical microscope. Any area of about 1 mm×1 mm was determined as one block. Within the block, a pore of an opening (diameter) equal to or larger than 1 μm was observed. The diameter of the opening portion of the pore was measured, and the frequency distribution of the diameter was inspected. In this instance, the maximum diameter of the pores which could be observed at any block was determined as the maximum pore diameter.

The pores are considered as being such openings that are inevitably and nearly uniformly formed in the ceramic substrate for the sake of the manufacturing process. For example, extremely large openings which rarely result from a manufacturing defect such as the bubbles included in a green sheet at the time of sheet forming and which are three times larger than the average size of the pores, are excluded in determination of the maximum pore diameter.

The lower electrode 3 is plated in such a manner similar to that in the first example so that samples of various thicknesses are obtained, and the dielectric layer 4, upper electrode layer 6, etc. are the same as those of the first embodiment. Further, judgment on whether the small condensers successfully stand the test or not was made in the similar manner to the first embodiment.

Figure 10:
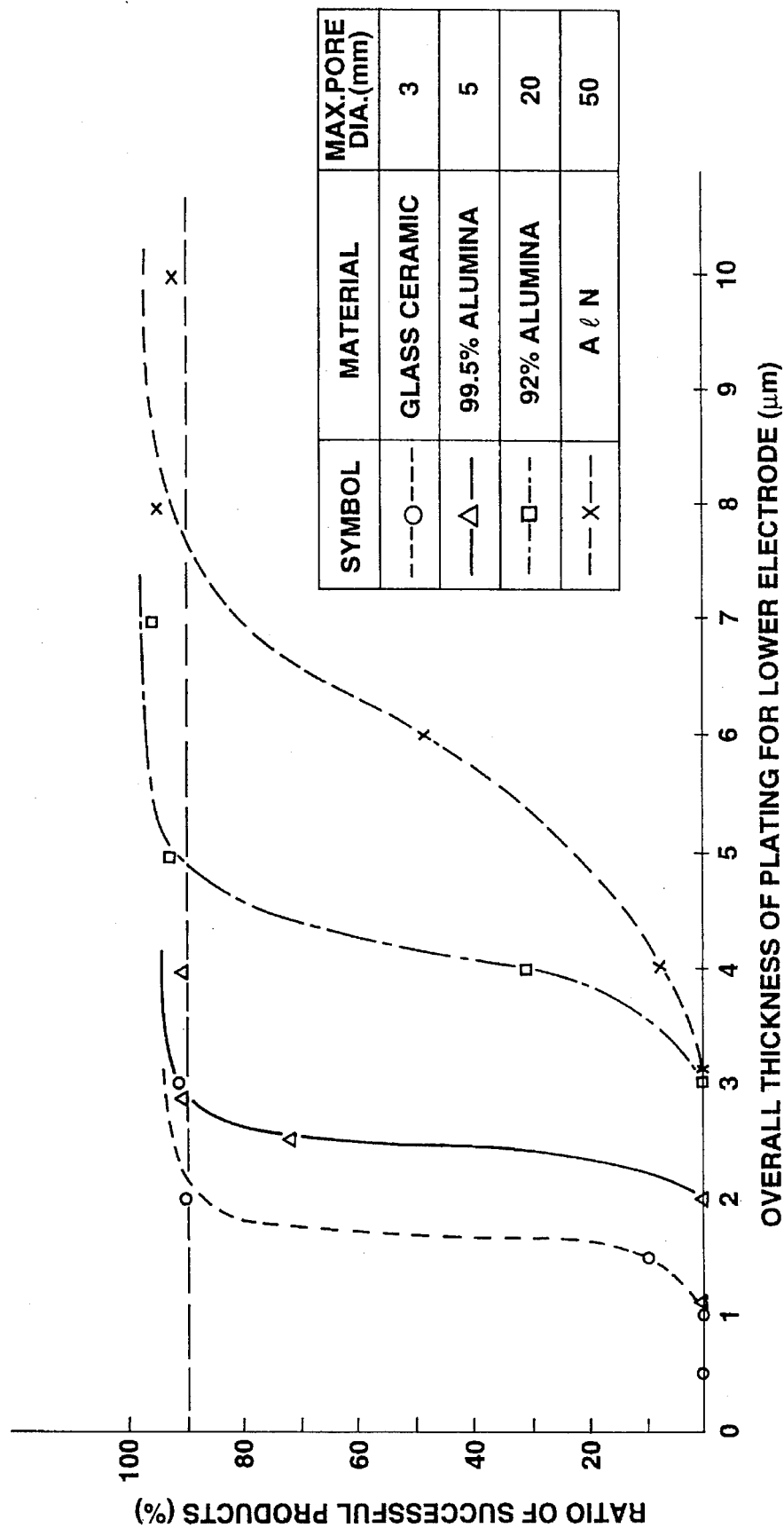
FIG. 10 is a graph of the relation between the thickness of the plating layer of the lower electrode and the ratio of successful products (yield rate) about the small condensers of the embodiment of FIG. 9.

The result of the test was shown in Table II and in FIG. 10.

TABLE II

| SAMPLE No. | LOWER ELECTRODE | | OVERALL THICKNESS (μm) | RATIO OF SUCCESSFUL PRODUCTS (YIELD RATE) (%) | | | |
|---|---|---|---|---|---|---|---|
| | MATERIAL OF PLATING | THICKNESS (μm) | | GLASS CERAMIC | 99.5% ALUMINA | 92% ALUMINA | AlN |
| 7 | Cu | 0 | 0.5 | 0 | — | — | — |
|   | Ni | 0.5 | | | | | |
| 8 | Cu | 0.5 | 1.0 | 0 | 0 | — | — |
|   | Ni | 0.5 | | | | | |
| 9 | Cu | 1.0 | 1.5 | 9.8 | — | — | — |
|   | Ni | 0.5 | | | | | |
| 10 | Cu | 1.5 | 2.0 | 89.8 | 0 | — | — |
|    | Ni | 0.5 | | | | | |
| 11 | Cu | 2.0 | 2.5 | — | 71.9 | — | — |
|    | Ni | 0.5 | | | | | |
| 12 | Cu | 2.5 | 3.0 | 91.4 | 91.4 | 0 | 0 |
|    | Ni | 0.5 | | | | | |
| 13 | Cu | 3.5 | 4.0 | — | 90.2 | 30.9 | 7.8 |
|    | Ni | 0.5 | | | | | |
| 14 | Cu | 4.5 | 5.0 | — | — | 93.0 | — |
|    | Ni | 0.5 | | | | | |
| 15 | Cu | 5.5 | 6.0 | — | — | — | 47.7 |
|    | Ni | 0.5 | | | | | |
| 16 | Cu | 6.5 | 7.0 | — | — | 95.7 | 78.1 |
|    | Ni | 0.5 | | | | | |
| 17 | Cu | 7.5 | 8.0 | — | — | — | 94.9 |
|    | Ni | 0.5 | | | | | |
| 18 | Cu | 9.5 | 10.0 | — | — | — | 91.8 |
|    | Ni | 0.5 | | | | | |

In Table II, it is to be noted that the lower electrode underlayer is Ti—Cu (0.2–0.5 μm) spatter, the dielectric layer is $Ta_2O_5$ (0.5–1.0 μm) reactive spatter, the upper electrode underlayer is Mo—Cu (0.3–0.5 μm) spatter, and the upper electrode is Cu—Ni (5–2 μm) plating.

From this result, it will be seen that there is a singular point area or transformation area in which a slight variation of the thickness of the lower electrode causes the ratio of successful products (i.e., yield rate) to vary largely.

This indicates that in order for the plating layer to flatten or smooth the pore portion (recessed portion) and thereby prevent a short circuit between the upper electrode and the lower electrode, etc. it needs to be thick to some extent.

For example, it will be seen that since a generally used ceramic substrate made of about 92% alumina has a maximum pore diameter of about 20 μm, the plating thickness needs to be about 5 μm or more, and the plating layer of the thickness of 5 μm or more makes it possible to attain a sufficiently high ratio of successful products.

Figure 11:
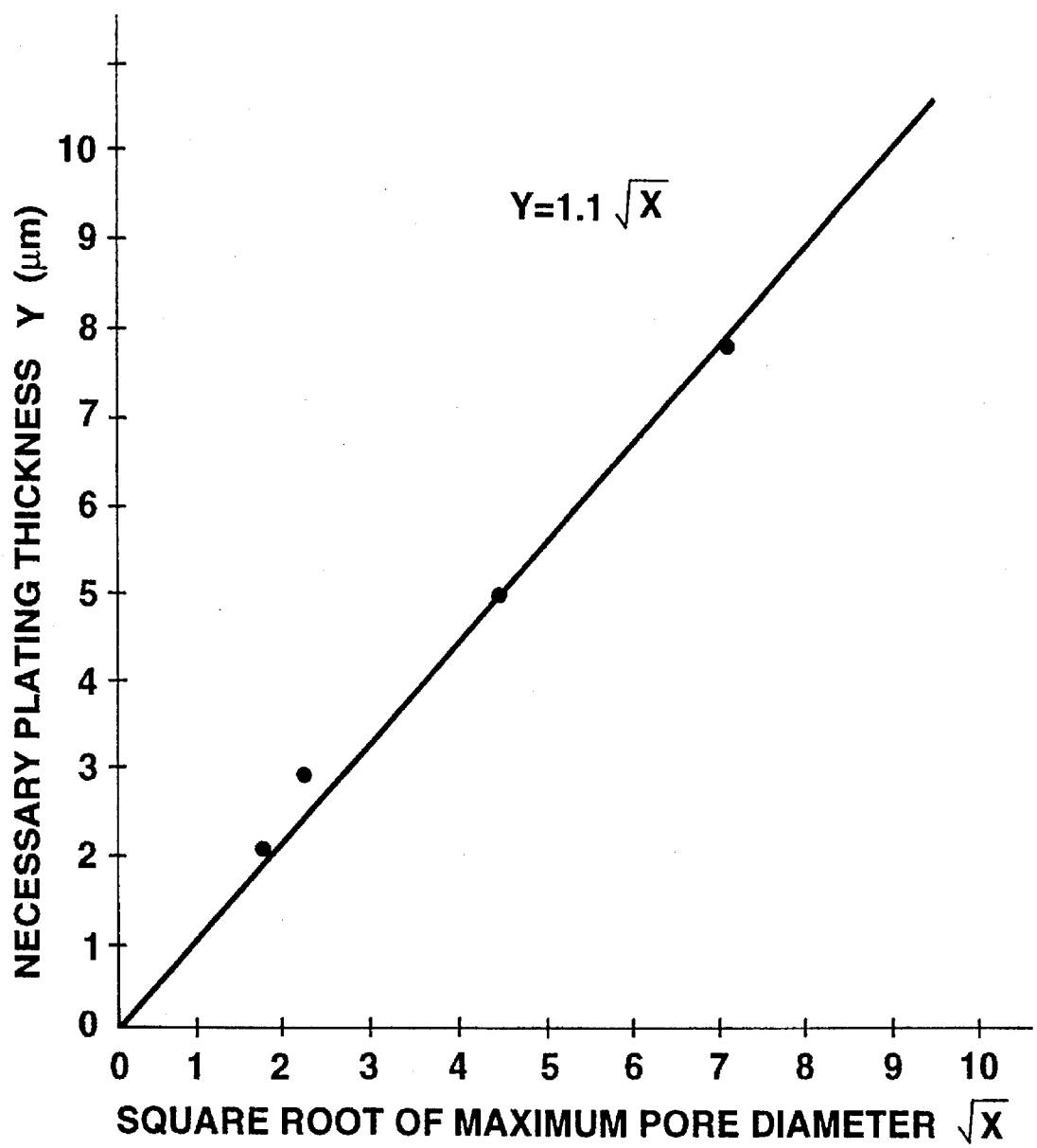
FIG. 11 is a graph of the relation between the overall plating thickness of the lower electrode and the ratio of successful products, with respect to variations of the material of the ceramic substrate (i.e., variations of maximum pore diameter) of the embodiment of FIG. 9.

In this connection, if the judgment on whether the thickness of the plating layer is good or not is made on the basis of whether the ratio of successful products is equal to or larger than 90% or not, the relation between the minimum thickness "Y" necessitated for the lower electrode (hereinafter referred to simply as "necessary plating thickness" ) and the maximum pore diameter "X" is such that when X is 3 μm, Y is 2.1 μm; when X is 5 μm, Y is 2.9 mm; when X is 20 μm, Y is 4.9 μm; and when X is 50 μm, Y is 7.7 μm, and is represented in the graph of FIG. 11. That is, it will be seen that if $Y \geqq 1.1 \sqrt{X}$, the ratio of succefful products about the small condensers is equal to or larger than 90%.

This result shows that the minimum thickness of the plating layer necessitated for attaining the ratio of successful products of 90% or more is related to nothing but the maximum diameter of the pores existing in the surface of the substrate.

Accordingly, by inspecting the size (diameter) of the pores existing in the surface of the substrate which is to be formed with thin-film condensers, the necessary plating thickness of the lower electrode can be obtained, thus making it possible to design the condenser (i.e., thickness of lower electrode) quite with ease and retain a high yield rate in the production of the condenser.

By this, it becomes unnecessary to conduct experiments on the thickness of the plating layer and determine it experimentally, thus making it possible to reduce the time and cost for development and design of the ceramic substrate for forming thereon a thin-film condenser.

On the other hand, the upper limit of the plating thickness is not determined on the ratio of successful products (yield rate) of the condenser or the like but on the working efficiency and man-hour. Generally, the thinner the plating thickness is, the less the man-hour is needed, thus making it possible to reduce the cost. On the contrary, the thicker the plating thickness is, the more the man-hour for the plating process is needed, thus being inconvenient from the point of view of a manufacturing process and furthermore increasing the cost. Accordingly, the plating thickness has an upper limit in accordance with the cost, etc.

When the plating layer is thin, it becomes high in the electrical resistance and is lowered in the properties as a condenser electrode. Thus, there may occur such a case in which a larger plating thickness than that required on the basis of the size of the pores is necessitated in order to lower the electrical resistance. In such a case, the lower limit of the plating thickness may be around the thickness that can attain a desired electrical resistance.

If, prior to laminating and forming a dielectric layer on a plating layer formed as a lower electrode, the plating layer is subject to polishing, the surface of the lower electrode can be smoother or flatter, thus being more suited to adoption to a thin-film condenser.

That is, while the plating layer has a flattening or smoothing effect, there is such a case in which the plating in the form of grains or drops is formed on the surface of the plating layer due to the effect of the impurities in the plating solutions or another effect.

Accordingly, by removing the portion having grown in the above manner by grinding or polishing, the smoother surface can be obtained, thus making it possible to eliminate a short circuit or the like at such a portion.

For example, polishing by using alumina abrasives of the grain size of 0.8~1.6 μm, can be mentioned. The abrasives can be MEDIPOL sold by Fujimi Inc. Further, by making the plating layer grow so as to be thicker than it is required and thereafter polishing the plating layer in such a manner that a desired thickness of the plating layer is obtained, the surface of the lower electrode can be made flat and smooth regardless of the irregularity of the surface of the ceramic substrate, thus making it possible to increase the ratio of successful products about the condenser.

While the present invention has been described and shown as above, it is not for the purpose of limitation but various modifications and variations thereof can be made without departing from the scope of the invention.

That is, while alumina, AlN (aluminum nitride) and glass ceramic have been described by way of example as the material for forming the ceramic substrate, it is not for the purpose of limitation but mullite, cordierite, silicon nitride or the like can be used.

Further, while the lower electrode has been described and shown by way of example as being obtained by first forming an underlayer by spattering and then forming on the underlayer a lower electrode by plating, the underlayer is not limited to such one that is formed by spattering but can be formed by another thin-film forming technique such as deposition or the like.

Further, it will be apparent that a similar effect can be obtained when the lower electrode is formed by electroless plating which forms a plating layer on the ceramic substrate, after the ceramic substrate is processed by activation, by using electroless plating solutions.

In this instance, a costly spattering process, etc. for the underlayer can be omitted, thus making it possible to form the lower electrode at a reduced cost.

The materials of the lower electrode and the underlayer can be determined suitably in accordance with the materials of the ceramic substrate and the dielectric layer, etc. without being limited to those of the above described examples.

In the meantime, the reason why, in the many of the above described examples, two layers, i.e., a Cu-plating layer and a Ni-plating layer are provided, the Cu-plating layer is used with a view to lowering the resistance of the lower electrode and the Ni-plating layer is used with a view to improving the heat-resisting property of the condenser, so the present invention does not always require to have such two plating layers.

On the other hand, it is not necessary to limit the plating layer or layers to one layer or two layers, and the plating layers can be constructed of three or more layers.

In this instance, it is desirable to process the surface side of the lower electrode by luster plating since the surface of the lower electrode can be smoother than that processed by lustless plating.

Further, in the present invention, it is not necessary to limit the materials of the dielectric layer and the upper electrode to those of the above described embodiments.

This is because according to the present invention an improved reliability of a condenser can be attained so long as the dielectric layer is formed from a thin-film dielectric material, for example, the present invention is applicable to such a case where a Perovskite type ceramic dielectric material such as PZT, $SrTiO_3$ or the like is used for forming the dielectric layer.

Further, it will be apparent that the ceramic substrate of the present invention includes not only a substrate of the type having no wiring inside thereof as shown in the examples but a substrate of the type having a circuit wiring inside thereof.

From the foregoing, it will be understood that according to the present invention by forming on a ceramic substrate a lower electrode by plating and in case a dielectric layer and an upper electrode are formed on the lower electrode to constitute a thin-film condenser, it becomes possible to obtain a condenser of a high reliability at a high yield rate.

It will be further understood that by calculating the minimum necessary thickness of the lower electrode from the size of pores existing in the surface of the ceramic substrate, it becomes possible to provide a ceramic substrate enabling to obtain a condenser quite with ease and at a high yield rate. Accordingly, the present invention can produce such an effect that it becomes possible to form on the ceramic substrate having such a lower electrode, a thin-film condenser at a low cost.

What is claimed is:

1. A ceramic substrate and condenser assembly comprising:

a ceramic substrate having a planar surface, said surface having pores existing in at least a portion thereof; and a plurality of electrically connected thin-film condensers formed on said ceramic substrate;

wherein said plurality of thin-film condensers have a common lower electrode which consists essentially of a plating layer formed on said planar surface of said ceramic substrate, and wherein the thickness Y (μm) of said lower electrode and the maximum pore diameter X (μm) of said pores existing in said planar surface of said ceramic substrate have a relation expressed by $$Y \geq 1.1 \sqrt{X}.$$

2. A ceramic substrate and condenser assembly according to claim 1, wherein said plating layer is a luster plating layer.

3. A ceramic substrate and electrode assembly comprising:

a ceramic substrate having a planar surface with pores existing in at least a portion thereof; and a lower electrode for a thin-film condenser, said lower electrode being formed on said planar surface of said ceramic substrate, said lower electrode consisting essentially of a plating layer; and wherein the thickness Y (μm) of said lower electrode and the maximum pore diameter X (μm) of said pores existing in said surface of said ceramic substrate, have a relation expressed by $$Y \geq 1.1 \sqrt{X}.$$

4. A ceramic substrate and electrode assembly according to claim 3, wherein said plating layer is a luster plating layer.

5. A ceramic substrate having on a surface thereof, a lower electrode which is adapted for forming a thin-film condenser, said lower electrode being formed by plating, and wherein said surface has pores existing therein, and the thickness Y (μm) of said lower electrode and the maximum pore diameter X (μm) of said pores existing in said surface of said ceramic substrate have a relation expressed by $$Y \geq 1.1 \sqrt{X}.$$

6. A ceramic substrate according to claim 5, wherein said lower electrode is formed by luster plating.

* * * * *